United States Patent
Chu et al.

(10) Patent No.: US 9,232,472 B2
(45) Date of Patent: Jan. 5, 2016

(54) MULTIPLE MAC ADDRESSES IN A DEVICE

(75) Inventors: Liwen Chu, San Ramon, CA (US); George A. Vlantis, Sunnyvale, CA (US)

(73) Assignee: STMICROELECTRONICS, INC., Coppell, TX (US)

( * ) Notice: Subject to any disclaimer, the term of this patent is extended or adjusted under 35 U.S.C. 154(b) by 343 days.

(21) Appl. No.: 13/335,590

(22) Filed: Dec. 22, 2011

(65) Prior Publication Data

US 2012/0163264 A1     Jun. 28, 2012

Related U.S. Application Data

(60) Provisional application No. 61/426,983, filed on Dec. 23, 2010.

(51) Int. Cl.
| | |
|---|---|
| *H04W 28/00* | (2009.01) |
| *H04W 52/02* | (2009.01) |
| *H04L 29/12* | (2006.01) |
| *H04W 84/12* | (2009.01) |
| *H04W 74/00* | (2009.01) |
| *H04W 74/08* | (2009.01) |
| *H04W 8/26* | (2009.01) |
| *H04W 12/06* | (2009.01) |
| *H04W 76/02* | (2009.01) |

(52) U.S. Cl.
CPC ....... *H04W 52/0216* (2013.01); *H04L 29/1232* (2013.01); *H04L 29/12839* (2013.01); *H04L 61/2092* (2013.01); *H04L 61/6022* (2013.01); *H04W 8/26* (2013.01); *H04W 12/06* (2013.01); *H04W 74/006* (2013.01); *H04W 74/08* (2013.01); *H04W 76/023* (2013.01); *H04W 84/12* (2013.01); *Y02B 60/50* (2013.01)

(58) Field of Classification Search
CPC . H04W 76/023; H04W 52/0216; H04W 8/26; H04W 12/06; H04W 88/06; H04W 48/18; H04W 12/04; H04W 84/12; H04L 61/6022; H04L 61/2038; H04L 63/061; H04L 63/162; H04L 63/123; H04L 2209/80
USPC .................................. 370/252, 311, 328, 329
See application file for complete search history.

(56) References Cited

U.S. PATENT DOCUMENTS

| | | |
|---|---|---|
| 8,274,894 B2 | 9/2012 | Kneckt et al. |
| 2003/0169697 A1 | 9/2003 | Suzuki et al. |
| 2004/0171407 A1 | 9/2004 | Ninomiya |
| 2004/0196800 A1 | 10/2004 | Padovani et al. |

(Continued)

OTHER PUBLICATIONS

"Protocol Identification", PWG-2010-0135-00-Virtual MAC and PAL Identification, Feb. 17, 2010, pp. 1-5.

(Continued)

*Primary Examiner* — Jae Y Lee
*Assistant Examiner* — Jean F Voltaire
(74) *Attorney, Agent, or Firm* — Allen, Dyer, Doppelt, Milbrath & Gilchrist, P.A.

(57) ABSTRACT

Multiple virtual MAC addresses may be added to WGA devices that may have different traffic streams to another device that requires different services, thus creating distinct MAC and device level implications. Beamforming training can be done at the device level for all virtual MAC addresses. Wakeup, doze, and ATIM power save can be done at the device level depending on the frames received. Authentication, deauthentication, association, and deassociation can be done variously at both levels. Further MSDUs can be aggregated for the multiple MAC addresses.

18 Claims, 10 Drawing Sheets

(56) References Cited

U.S. PATENT DOCUMENTS

| | | |
|---|---|---|
| 2005/0124294 A1 | 6/2005 | Wentink |
| 2006/0234636 A1* | 10/2006 | Miller et al. ............... 455/67.11 |
| 2006/0256763 A1* | 11/2006 | Nguyen et al. ............... 370/338 |
| 2008/0005343 A1* | 1/2008 | Bauman et al. ............... 709/230 |
| 2009/0279464 A1 | 11/2009 | Kakani et al. |
| 2010/0290391 A1* | 11/2010 | Cheng et al. ............... 370/328 |
| 2011/0064033 A1* | 3/2011 | Gong et al. ............... 370/329 |
| 2011/0069650 A1 | 3/2011 | Singh et al. |
| 2011/0075642 A1* | 3/2011 | Cordeiro et al. ............... 370/338 |
| 2011/0090833 A1 | 4/2011 | Kneckt et al. |
| 2011/0134852 A1 | 6/2011 | Cordeiro |
| 2011/0158142 A1* | 6/2011 | Gong et al. ............... 370/311 |
| 2011/0170468 A1 | 7/2011 | Jain et al. |
| 2011/0305216 A1* | 12/2011 | Seok ............... 370/329 |

OTHER PUBLICATIONS

"Protocol Identification", PWG-2010-0135-01-Virtual MAC and PAL Identification, Mar. 9, 2010, pp. 1-7.

"Protocol Identification", PWG-2010-0135-02-Virtual MAC and PAL Identification, Jun. 23, 2010, pp. 1-8.

"Protocol Identification", PWG-2010-0135-03-Virtual MAC and PAL Identification, Jul. 8, 2010, pp. 1-5.

"Protocol Identification", PWG-2010-0135-04-Virtual MAC and PAL Identification, Jul. 8, 2010, pp. 1-5.

"Protocol Identification", PWG-2010-0135-05-Virtual MAC and PAL Identification, Jul. 8, 2010, pp. 1-5.

"Protocol Identification", PWG-2010-0135-06-Virtual MAC and PAL Identification, Jul. 8, 2010, pp. 1-5.

"Protocol Identification", PWG-2010-0135-07-Virtual MAC and PAL Identification, Sep. 9, 2010, pp. 1-7.

* cited by examiner

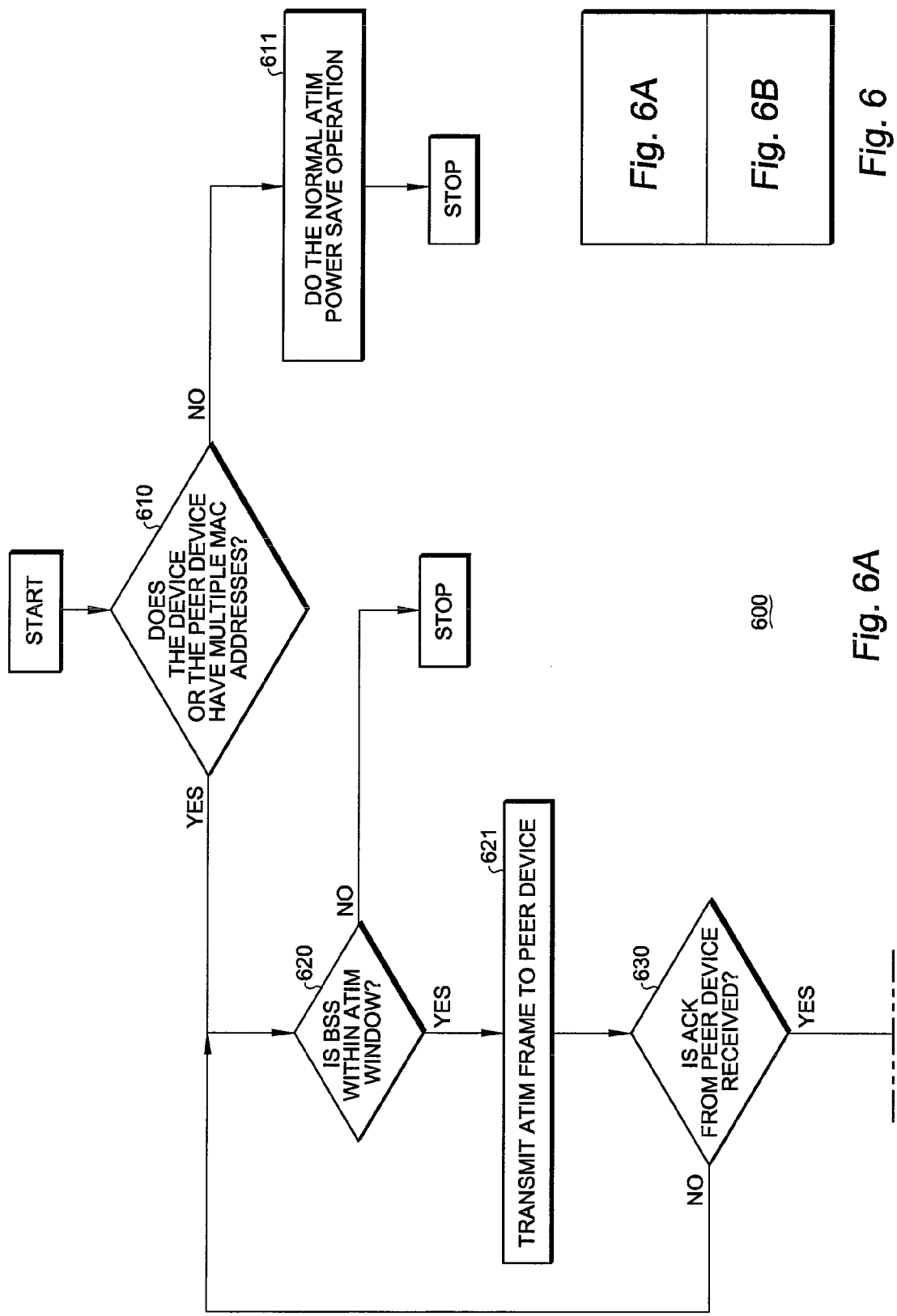

MULTIPLE MAC ADDRESSES IN A DEVICE

RELATED APPLICATION

The present invention claims priority from U.S. Provisional Patent Application Ser. No. 61/426,983 filed Dec. 23, 2010, and is incorporated herein by reference in its entirety for all purposes as if fully set forth herein.

FIELD OF THE INVENTION

This invention relates generally to multiple MAC (Media Access Control) addresses in a device and more particularly to multiple MAC addresses in WGA (Wireless Gigabit Alliance) devices or other wireless devices (e.g. 802.11 VHT devices).

BACKGROUND OF THE INVENTION

A WGA device may have different traffic streams to another WGA device. For example, video traffic may require HDCP (High Definition Copy Protocol) encryption/decryption at the application layer, which is the upper layer of the MAC layer; this kind of traffic should not be encrypted in the MAC layer again. However, internet access may require MAC layer encryption/decryption.

To solve this problem, the WGA draft proposes to use the virtual MAC address method. A device has multiple STAs (stations). Each STA is identified by a MAC address. PCP (Personal Basic Set Control Point)/AP (Access Point) device can broadcast multiple BSSID (Basic Service Set Identifier) elements. Each BSSID identifies an PCP/AP. Different PCPs/APs can have different security capabilities: PCP/AP for video traffic indicates no MAC encryption/decryption capability, and PCP/AP for internet access indicates MAC encryption/decryption capability. Also, different STAs associate with different PCP/APs: STAs for video transmission associates with PCP/APs without encryption/decryption capability, and STAs for internet access associates with PCPs/APs with encryption/decryption capability.

There are many implications associated with virtual MAC addresses. There needs to be a separate security association for each STA that is identified by the virtual MAC address. It is required when L2 (Layer 2) security is expected, and it implies the establishment, termination, policies, keys, states, etc. for each STA (Station) that is identified by the virtual MAC instance. Also, beam training must be done for each STA that is identified by the association ID (AID)/MAC address explicitly as peer STAs) do not know the MAC addresses for the device. Therefore, there is redundancy in the case of multiple STAs that are identified by the virtual MACs within one physical device. This decreases protocol efficiency and increases power consumption. Further, SP allocation needs to be done for each STA that is identified by the AID separately, which is not optimal from a protocol efficiency or complexity perspective. Still further, to support multiple virtual MAC addresses adds implementation complexity, which is proportional to the number of virtual MACs to be supported simultaneously.

When two wireless devices other than WGA devices (e.g. 802.11 VHT devices) have multiple MAC address for some reason and need to communicate with other, they need to do beamforming two times for each pair of STAs that are identified by the MAC addresses. Also, other MAC layer redundancies exist. Such complexity should also be solved.

Therefore, there is a further need to support multiple MAC addresses in the art.

SUMMARY OF THE INVENTION

According to an embodiment of the invention, a device comprises a Multiple MAC Addresses element, comprising a device MAC address and a plurality of virtual MAC addresses. Each MAC address identifies a STA (station). The device tells its peer device of its multiple addresses through transmitting the Multiple MAC Addresses element.

According to an embodiment of the invention, a method of beamforming training a device comprises checking if the device and a peer device have multiple MAC addresses, if yes, checking if a MAC address of the device finished beamforming training with a MAC address of the peer device, and if yes, using a beamforming result between the device and the peer device to transmit frames between STAs of the devices that are identified by MAC addresses of the devices.

According to an embodiment of the invention, a method of wakeup BI calculation for a non-PCP/non-AP STA device comprises checking if the device have multiple MAC addresses, and if yes, calculating a wakeup BI per pseudo-static schedule or wakeup element, wherein the wakeup BIs are wakeup BIs of all STAs that are identified by all MAC addresses in a Multiple MAC Addresses element.

According to an embodiment of the invention, a method of doze BI calculation for a PCP/AP device comprises checking if the device have multiple MAC addresses, and if yes, calculating a doze BI per pseudo-static schedule or wakeup element, wherein the doze BIs are doze BIs of all PCPs/APs that are identified by all MAC addresses in a Multiple MAC Addresses element.

According to an embodiment of the invention, a method of transmitting or receiving ATIM (Announcement Traffic Indication Message) frames to a power save device comprises checking if the device or a peer device has Multiple MAC Addresses, if yes, the ATIM frame exchange results can be used for any STAs that are identified by any MAC addresses of the device.

According to an embodiment of the invention, a method of transmitting frames to a power save device comprises checking if the device or a peer device have Multiple MAC Addresses, if yes, transmitting frames to the peer device, transmitting a buffered frame with EOSP (End of Service Period) set to '0' to the peer device until the buffered frame is a last frame from any STAs that are identified by any MAC addresses of the device to STAs that are identified by MAC addresses of the peer device, and, if yes, transmitting the buffered frame with EOSP set to '1' to the peer device.

According to an embodiment of the invention, a device comprises a non-transmitted MAC address association IE (Information Element) comprising a non-transmitted MAC address, an associated non-transmitted BSSID, and an RSN sub element.

According to an embodiment of the invention, a device comprising an A-MSDU (Aggregate MSDU) comprising an RA (Receiver Address), a TA (Transmitter Address), and a frame body comprising a plurality of A-MSDU subframes, and the subframes comprising a destination address and a source address.

The foregoing and other features, utilities and advantages of the invention will be apparent from the following more particular description of an embodiment of the invention as illustrated in the accompanying drawings.

DETAILED DESCRIPTION

While the invention has been particularly shown and described with reference to a preferred embodiment thereof, it will be understood by those skilled in the art that various other changes in the form and details may be made without departing from the spirit and scope of the invention.

A presently preferred embodiment of the present invention and many of its improvements have been described with a degree of particularity. It should be understood that this description has been made by way of example, and that the invention is defined by the scope of the following claims.

Figure 1:
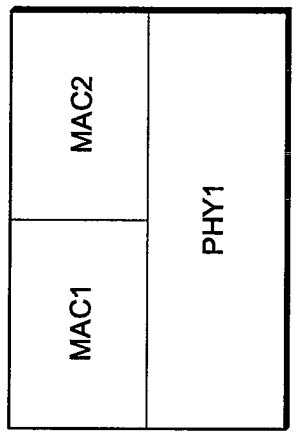
FIG. 1 illustrates a device with multiple MAC addresses.

FIG. 1 illustrates a device with multiple MAC addresses. The Device has one PHY: PHY1 and two MACs: MAC1, MAC2. Each MAC address identifies a STA (station). STA1 that includes MAC1 and PHY1 is identified by MAC address 1. STA2 that includes MAC2 and PHY1 is identified by MAC address 2.

Figure 2:
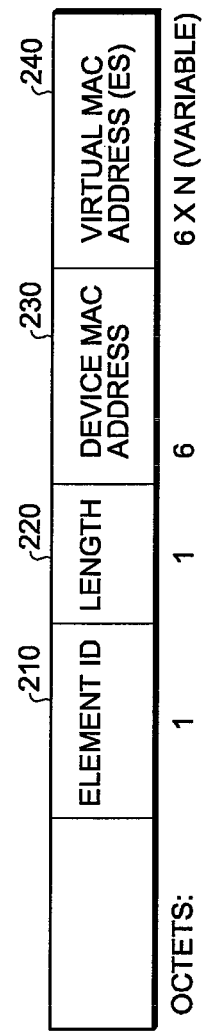
FIG. 2 illustrates a Multiple MAC Addresses element according to an embodiment of the invention.

FIG. 2 illustrates a Multiple MAC Addresses element according to an embodiment of the invention. Multiple MAC Addresses element 200 comprises element ID 210, length 220, device MAC address 230, and n virtual MAC addresses 240.

Multiple MAC Addresses divide a device into MAC-based and device-based features and are used to avoid double encryption/decryption in video application layer and MAC. Beamforming, power saving, security, and association should be device-based features.

Multiple MAC addresses element 200 is used to indicate the MAC addresses that a device uses and to further indicate the STAs that a device uses. The Multiple MAC Addresses element includes the following fields: a device MAC address that uniquely identifies the device, and virtual MAC address(es) that a device may have per up layer requirement. When a WGA device or other wireless device has a virtual MAC address besides its device MAC address, the related STA includes the Multiple MAC Addresses element in the Probe Request/Association Request, Information Request/Response frames. Then the PCP/AP device and the peer device know the MAC addresses that the device has. The STAs that are identified by the MAC addresses in Multiple MAC Addresses element 200 associate with the PCPs/APs that one PCP/AP devices uses. Another possible method to indicate multiple MAC addresses of a device is to indicate the transmit MAC address and other MAC addresses that the device have. The transmit MAC address is the transmitter MAC address (TA in MAC frame header) of the management frames that carry Multiple MAC Addresses element.

As we know, BSSID is the MAC address of the PCP/AP. So when one device broadcasts Multiple BSSID element in its Beacon/Association Response/Information Response, the device is multiple MAC addresses device and Multiple BSSID element indicates its multiple MAC addresses. The following optimization can be used for such PCP/AP device.

Figure 3:
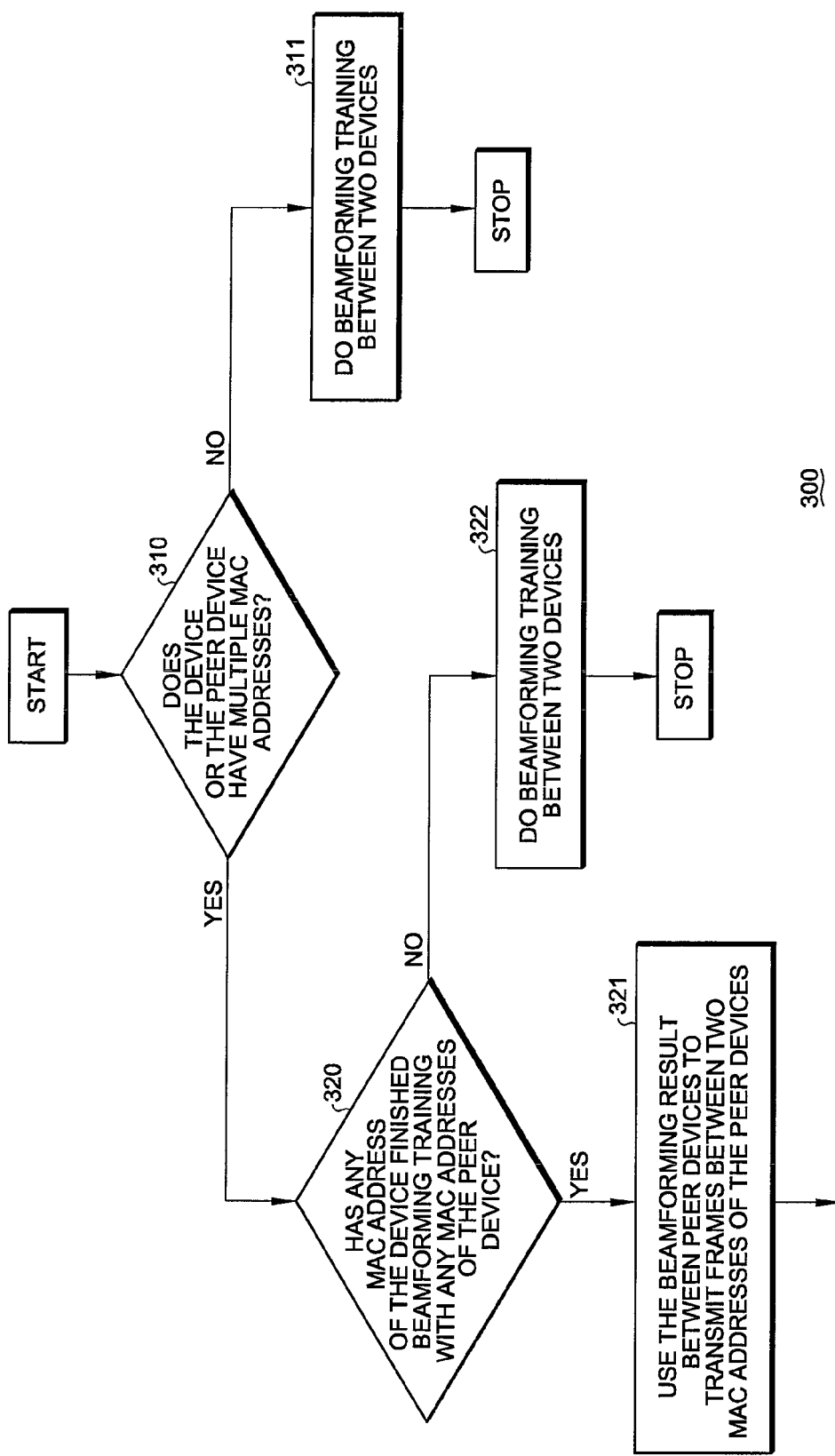
FIG. 3 illustrates a process of single beamforming training for a device pair with Multiple MAC Addresses according to an embodiment of the invention.

FIG. 3 illustrates a process of single beamforming training for a device pair with multiple MAC addresses according to an embodiment of the invention.

Beamforming training process 300 starts with checking if the device or the peer device has Multiple MAC Addresses 310. If there are no Multiple MAC Addresses, normal beamforming training is done between the two devices 311 and process 300 stops. If there is at least one device that has Multiple MAC Addresses at step 310, the process checks if any STAs that are identified by the MAC address of the device has finished beamforming training with any STAs that are identified by the MAC addresses of the peer device 320. If no, beamforming training can also be done normally between the two devices 322 and the process 300 stops. If yes, then the process uses the beamforming result between peer devices to transmit frames between the two STAs that are identified by the MAC addresses of the peer devices 321. The process terminates thereafter.

Thus, once beamforming training with a STA that is identified by the MAC address of a Multiple MAC Addresses element is done, the beamforming result will be used for all transmissions with any STAs that is identified by the MAC address in the Multiple MAC Addresses element. Also, if several STAs that are identified by the MAC addresses in a Multiple MAC Addresses element need MAC layer encryption/decryption, the PMK (Pairwise Master Key)/PTK (Pairwise Transient Key) negotiated by a STAs that is identified by the MAC address of a Multiple MAC Addresses element can be used by the other STAs that are identified by the MAC addresses in a Multiple MAC Addresses element that do MAC layer encryption/decryption. When a data frame is encrypted in the MAC layer, each STA that is identified by the MAC address has its own PN (Packet Number).

Figure 4:
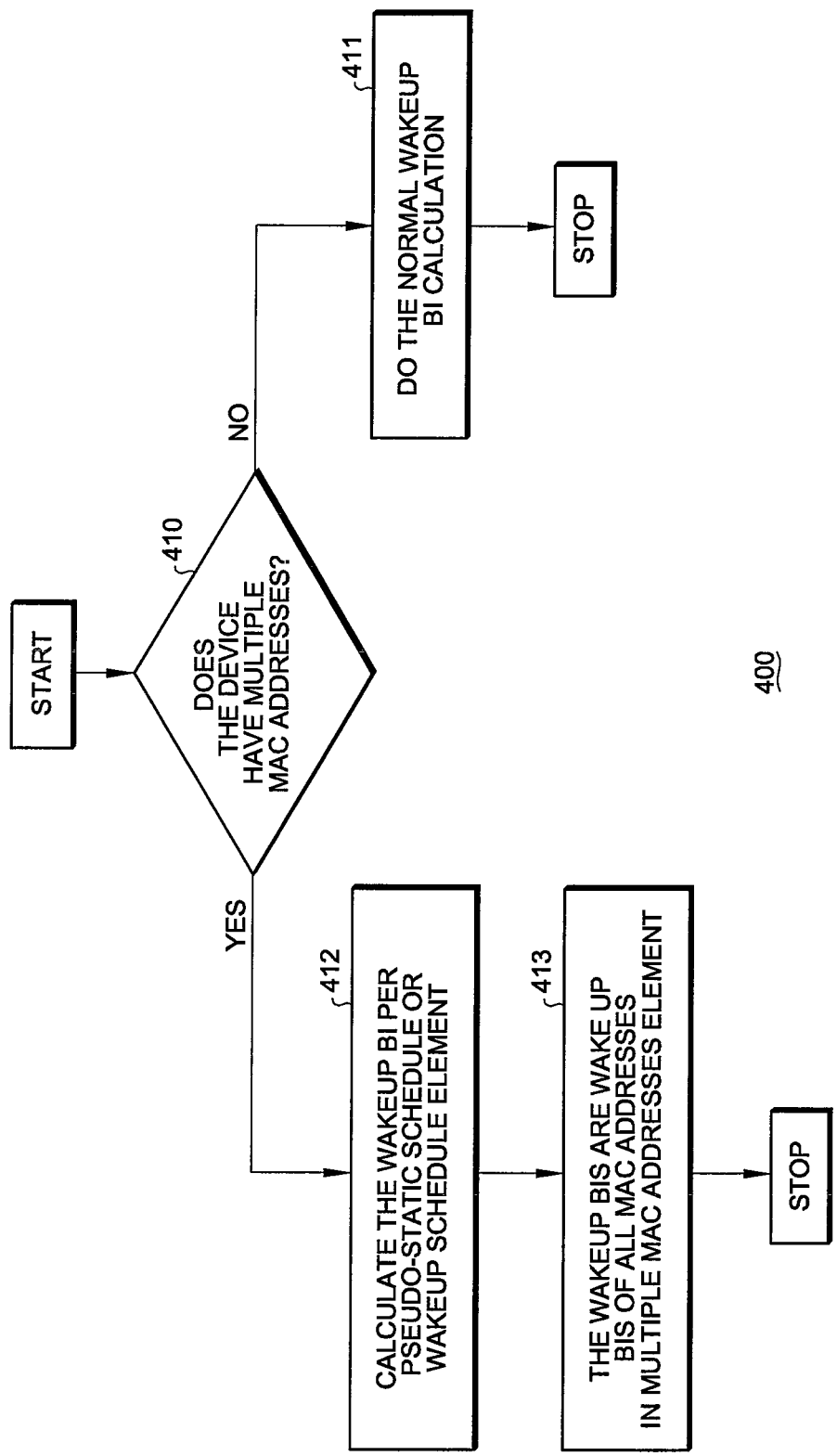
FIG. 4 illustrates a process of wakeup beacon interval (BI) calculation for a non-PCP/non-AP with Multiple MAC Addresses according to an embodiment of the invention.
Figure 5:
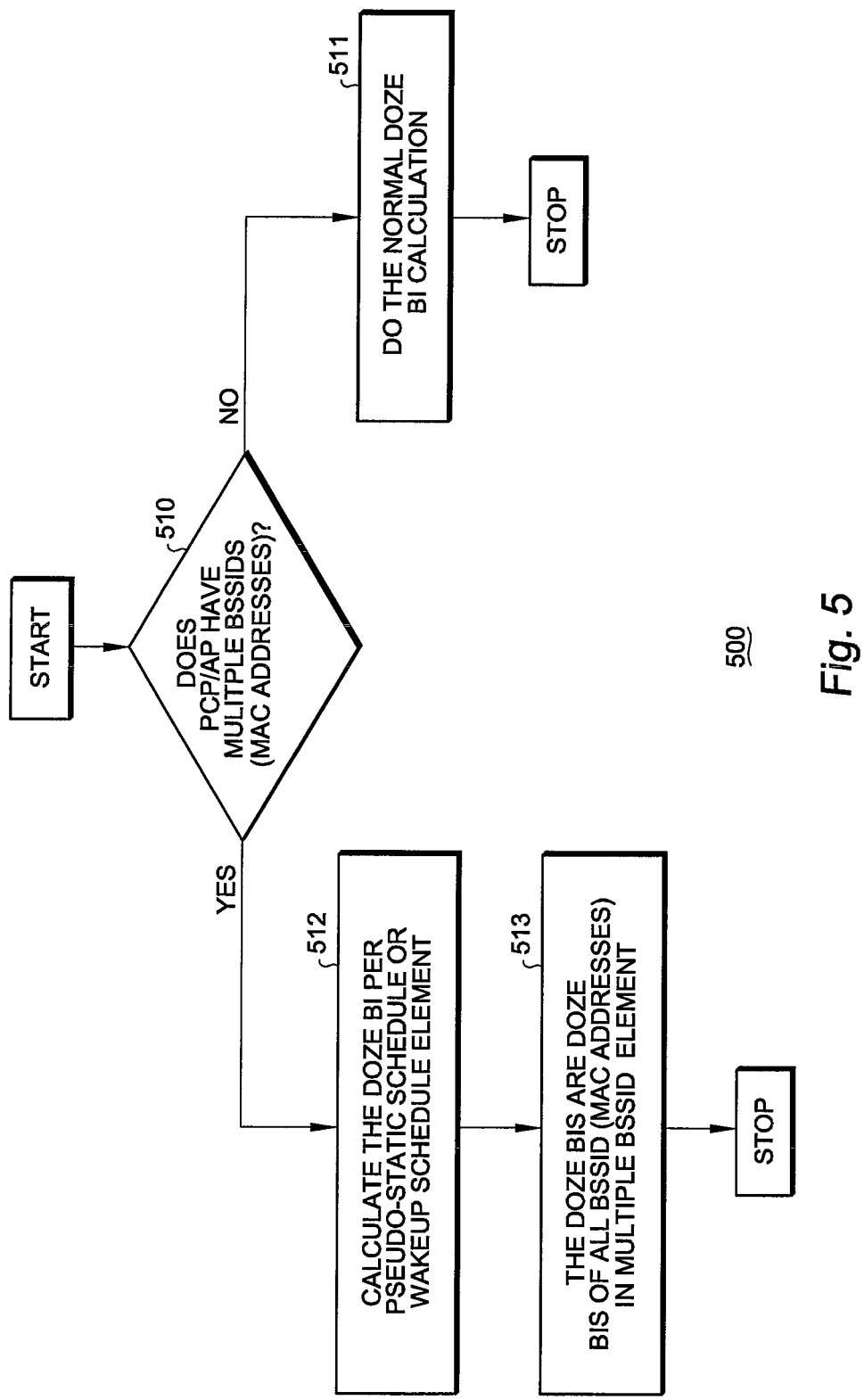
FIG. 5 illustrates a process for doze BI calculation for a PCP/AP with Multiple MAC Addresses according to an embodiment of the invention.

FIG. 4 illustrates a process of wakeup BI calculation for a non-PCP/non-AP device with Multiple MAC Addresses according to an embodiment of the invention. FIG. 5 illustrates a process for same doze BI for a device with Multiple MAC Addresses according to an embodiment of the invention.

In power saving with Multiple MAC Addresses, the wakeup schedule can be used by all the STAs that are identified by the MAC addresses in a Multiple MAC Addresses element of a device. The TBTT of all BSSIDs in a multiple BSSID element have the same value. The wake up BIs indicated by the wakeup schedule of a STA that is identified by the MAC address in a Multiple MAC Addresses element are the wakeup BIs of all STAs that are identified by the MAC addresses in a Multiple MAC Addresses element.

Process 400 for wakeup BI calculation of the non-PCP/non-AP STA that sets up a wakeup schedule first checks if the device has Multiple MAC Addresses 410. If no, then the normal wake BI calculation is performed 411 with the process terminating thereafter. If yes, first, calculate the wakeup BI per pseudo-static schedule or wakeup schedule element 412. The wakeup BIs are wake up BIs for all STAs that are identified by the MAC addresses in Multiple MAC Addresses element 413. The process then stops.

Process 500 for doze BI calculation of the PCP/AP that sets up a wakeup schedule first checks if the PCP/AP has multiple BSSIDs (MAC addresses of the PCPs/APs) 510. If no, then the normal doze BI calculation is performed 511. If yes, first, calculate the doze BI per pseudo-static schedule or wakeup schedule element 512. The doze BIs are doze BIs of all STAs that are identified by the BSSID (MAC addresses of the PCPs/APs) in a multiple BSSID element 513.

Figure 6B:
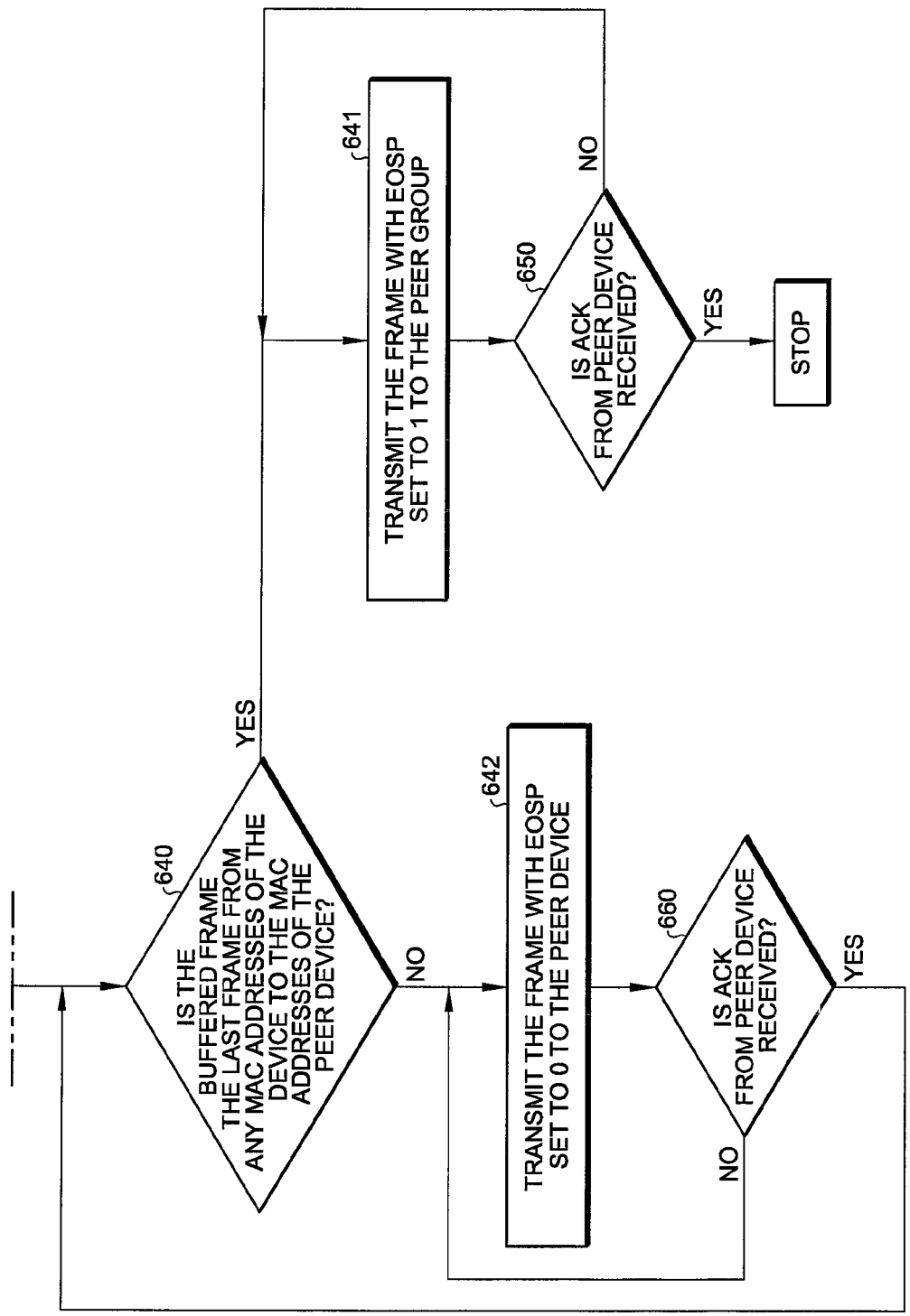
FIG. 6 illustrates a process for ATIM (Announcement Traffic Indication Message) operation of STA that transmits frames to power save STAs according to an embodiment of the invention.
Figure 7:
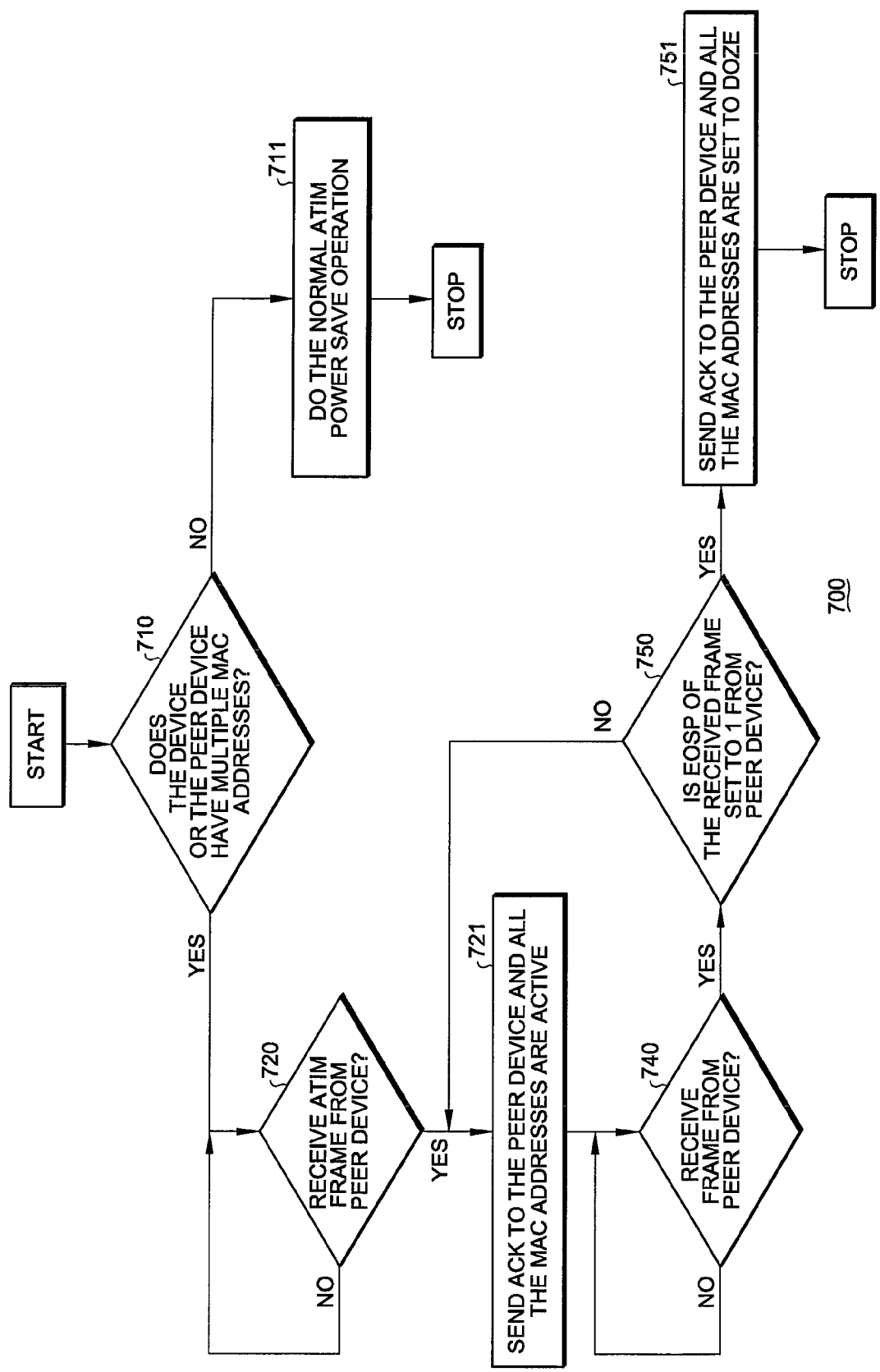
FIG. 7 illustrates a process for ATIM operation of STA that receives an ATIM frame according to an embodiment of the invention.

FIG. 6 illustrates a process for ATIM operation of STA that transmits frames to power save STAs according to an embodiment of the invention. FIG. 7 illustrates a process for ATIM operation of STA that receives ATIM frame according to an embodiment of the invention.

ATIM negotiation results in the Awake window and EOSP notification result of one STA pair that are identified by the one MAC address pair in the Awake window can be used for all STAs that are identified by the MAC addresses of the device pair that relates with the MAC address pair.

For example, device 1 has MAC addresses: MAC1,1; MAC1,2; and device 2 has MAC addresses MAC 2,1; MAC2,2; MAC2,3. Once the STA that is identified by the MAC1,1 transmits the ATIM to the STA that is identified by the MAC2,2 and then the STA that is identified by the MAC2,2 responds with Ack during an Awake window, STAs that are identified by MAC2,1; MAC2,2; MAC2,3 are awake in the following CBPs of the BI. Once the STA that is identified by MAC1,2 transmits a frame with EOSP set to 1 to the STA that is identified by MAC2,3, then the STA that is identified by MAC1,2 receives Ack from MAC2,3 and the STAs that are identified by MAC2,1; MAC2,2; MAC2,3 can go to doze state.

Process 600 for ATIM operation of STA that transmits frames to power save STAs starts with checking if the device or the peer device has Multiple MAC Addresses 610. If no, ATIM power save operation is done normally 611 and stops. If yes, check if BSS is within the ATIM window 620. If yes, the ATIM frame is transmitted to the peer device 621. If no, process 600 is stopped. Next, check if ACK is received from the peer device 630. If no, return to step 620. If yes, check if the buffered frame is the last frame from any STAs that are identified by the MAC addresses of the device to the STAs that are identified by the MAC addresses of the peer device 640. If yes, transmit the frame with EOSP set to '1' to the peer device 641. Then check if ACK is received from the peer device 650. If no, then process 600 returns to step 641. If yes, labeling that the peer device to go to sleep and the process 600 is stopped. With reference again to step 540, if the buffered frame is not the last frame from any STAs that are identified by the MAC addresses of the device to the STAs that are identified by the MAC addresses of the peer device, the process transmits the frame with EOSP set to '0' to the peer device 642. Then the process checks if ACK is received from the peer device 660. If no, process 600 returns to step 642. If yes, process 600 returns to step 640.

Process 700 for ATIM operation of STA that receives an ATIM frame starts with checking if the device or the peer device has Multiple MAC Addresses 710. If no, then normal ATIM power save operation is performed 611 and the process stops. If yes, check until ATIM is received from the peer device 720; if the ATIM is not received, the process waits until the end of ATIM window. When the ATIM is received, send ACK to the peer device and all the STAs that are identified by the MAC addresses are active 721. Next, check until a frame is received from the peer device 740. When the frame is received, check if the EOSP of the received frame is set to '1' from the peer device 750. If no, process 700 returns to step 721. If yes, send ACK to the peer device and all the STAs that are identified by the MAC addresses are set to doze 751.

Figure 8:
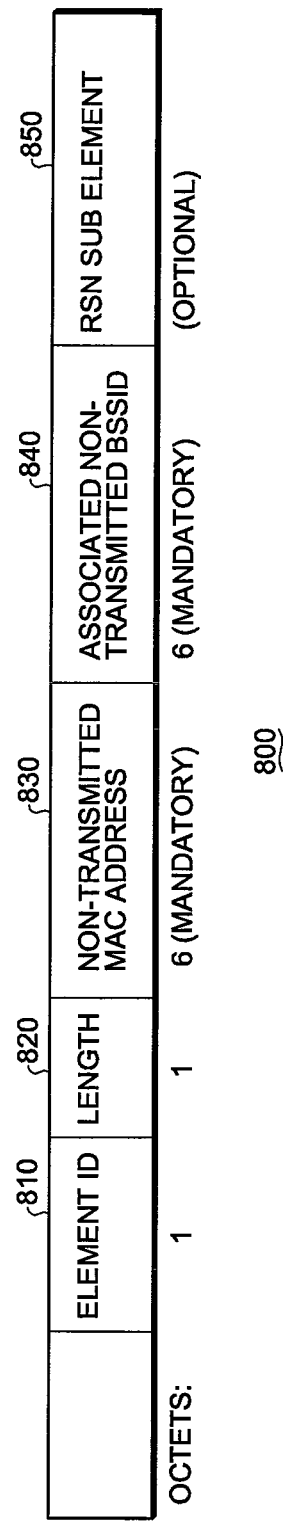
FIG. 8 illustrates a non-transmitted MAC address association information element (IE) according to an embodiment of the invention.

FIG. 8 illustrates a non-transmitted MAC address association information element (IE) according to an embodiment of the invention.

A non-transmitted MAC address association IE 800 is defined to include the following fields: element ID 810, length 820, a mandatory non-transmitted MAC address 830, a mandatory associated non-transmitted BSSID 840, and an optional RSN sub element 850. The non-transmitted BSSID 840 identifies one PCP/AP that the STA identified by the non-transmitted MAC address 830 wants to associate with. The optional RSN sub element 850 is for the STA identified by the non-transmitted MAC address 830 with the following properties. All the RSNs for STAs that are identified by MAC addresses in Multiple MAC Addresses element that requires MAC layer security are the same. The STAs that are identified by MAC addresses that do not require MAC layer security do not include RSN sub element. The STAs that are identified by MAC addresses in Multiple MAC Addresses element have the same properties, i.e. support rate, power constraint, etc. except for RSN.

Figure 9:
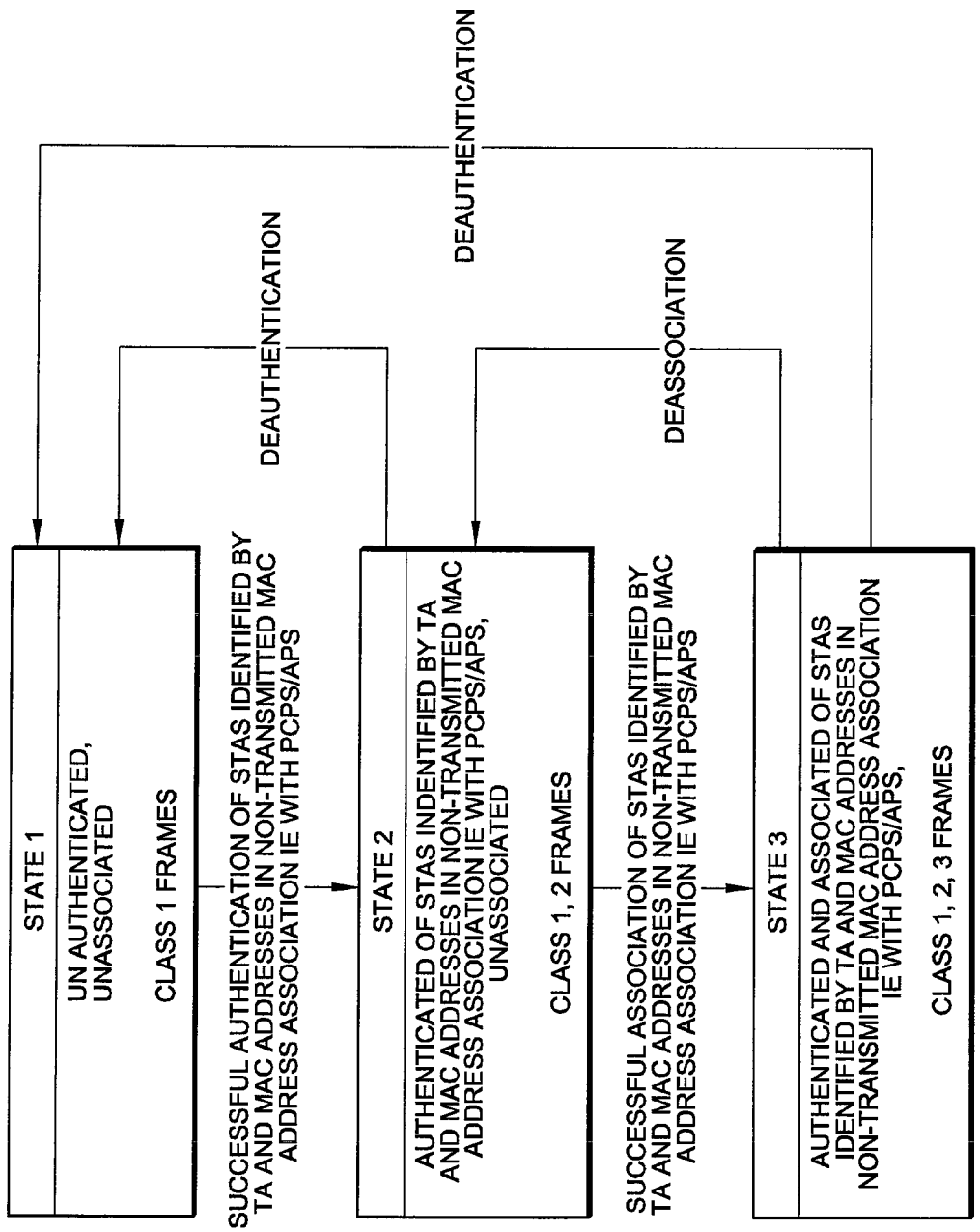
FIG. 9 illustrates a relationship diagram between a state and services of device with Multiple MAC Addresses according to an embodiment of the invention.

FIG. 9 illustrates a relationship diagram between state and services of device with Multiple MAC Address according to an embodiment of the invention.

Authentication/deauthentication includes non-transmitted MAC address association IE for all STAs that are identified by the MAC addresses that are included in non-transmitted MAC address association IE. All the STAs that are identified by TA and the MAC addresses in non-transmitted MAC address IE finish the authentication in one authentication procedure. Thus, there is one authentication exchange from STAs identified by TA and the MAC addresses in non-transmitted MAC address IE to PCPs/APs. The authentication results are same to STAs identified by TA and the MAC addresses in non-transmitted MAC address IE. All STAs that are identified by TA and the MAC addresses in non-transmitted MAC address IE finish deauthentication in one deauthentication procedure (one Deauthentication exchange). Thus, the deauthentication results are the same to STAs identified by TA and the MAC addresses in non-transmitted MAC address IE.

Association Request/Deassociation includes non-transmitted MAC address association IE for all STAs that are identified by TA and the MAC addresses that are included in non-transmitted MAC address association IE. All STAs that are identified by these MAC addresses finish the association in one association procedure (one Association Request/Response exchange). The association results are the same to all the STAs that are identified by TA and the MAC addresses in non-transmitted MAC address association IE. All STAs that are identified by TA and the MAC addresses in non-transmitted MAC address association IE finish the deassociation in one deassociation procedure (one Deassociation exchange). The association results are the same to all STAs that are identified by TA and the MAC addresses in non-transmitted MAC address association IE.

Referring to FIG. 9, state 1 contains the unauthenticated, unassociated devices and deals with class 1 frames. Through successful authentication of the STAs identified by TA and the MAC addresses in non-transmitted MAC address association IE with PCPs/APs, these STAs transition to state 2. State 2 contains all authenticated STAs but that are unassociated and deals with class 1 and 2 frames. Upon successful association of STAs identified by TA and the MAC addresses in non-transmitted MAC address association IE with PCPs/APs, these STAs transition to state 3. State 3 contains all authenticated and associated STAs and deals with class 1, 2, and 3 frames. State 3 devices transition to state 2 by deassociation and to state 1 by deauthentication. State 2 devices transitions to state 1 by deauthentication.

Figure 10:
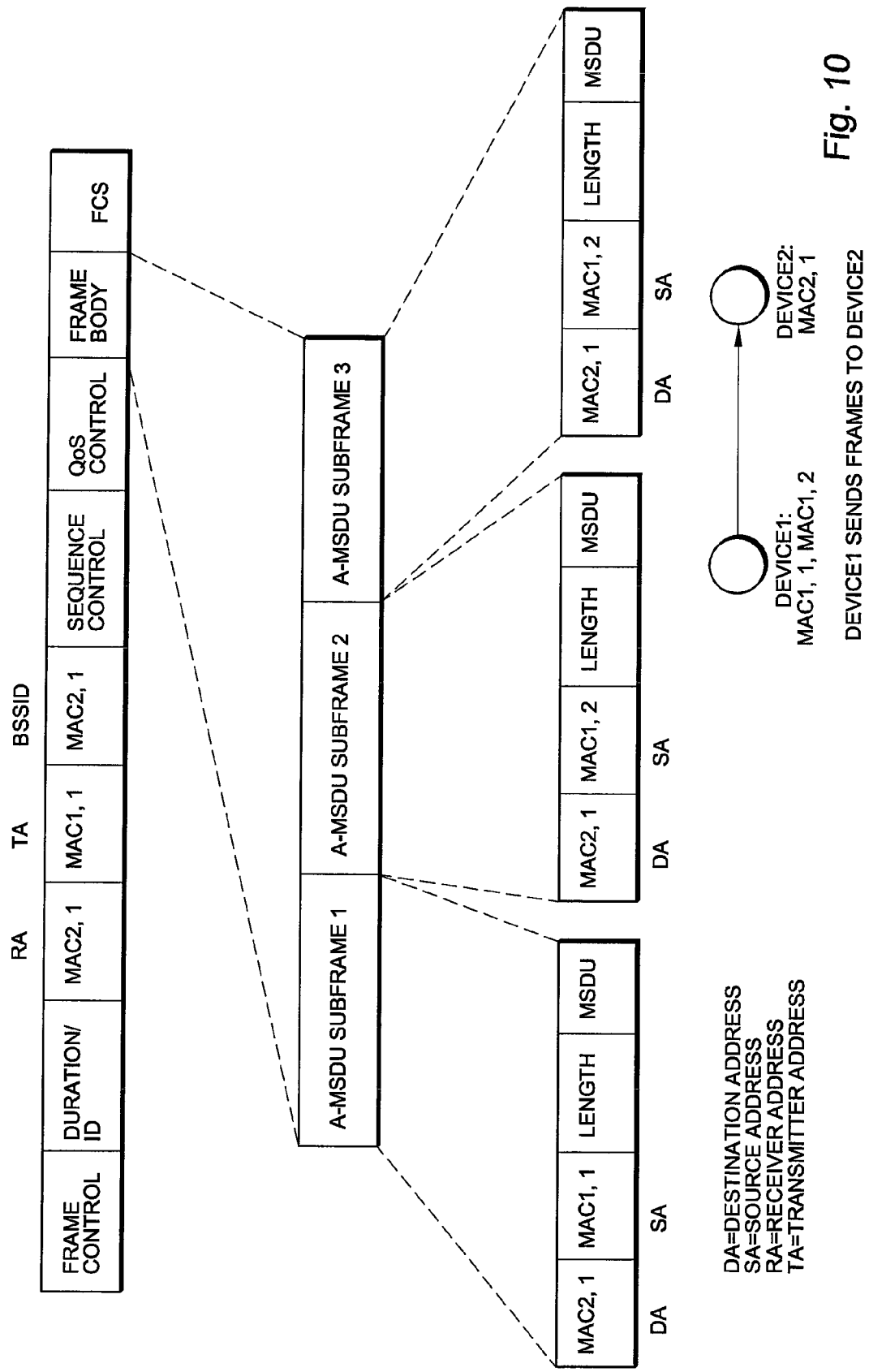
FIG. 10 illustrates an exemplary aggregated MSDU (MAC Service Data Unit) for multiple MAC addresses according to an embodiment of the invention.

FIG. 10 illustrates an exemplary aggregated MSDU for Multiple MAC Addresses according to an embodiment of the invention.

If the STAs that are identified by the MAC addresses of a source device and the STAs that are identified by the MAC addresses of the destination device have the same security policy, the MSDUs from STAs that are identified by these source MAC addresses to STAs that are identified by these destination MAC addresses can be aggregated in an aggregated MSDU (A-MSDU). Since Multiple MAC Addresses devices will have more MSDUs, there is more chance to aggregate.

Referring to FIG. 10, device 1 with MAC addresses 1,1 and MAC 1,2 sends frames to device 2 with MAC 2,1. For the RA and TA addresses can be one of the Multiple MAC Addresses of device 2 and 1, respectively. For example, the frame that include A-MSDU has RA of MAC2,1 and TA of MAC1,1. A-MSDU subframe 1 has DA (Destination Address) of MAC2,1 and SA (Source Address) of MAC 1,1. A-MSDU subframes 2 and 3 have DA of MAC2,1 and SA of MAC 1,2. This is possible as A-MSDU can aggregate different DA and SA Addresses in its A-MSDU subframes.

In an embodiment, the present invention can be implemented in software as executed by a central processing unit. Software programming code, which can embody the present invention, is typically accessed by a microprocessor from long-term, persistent storage media of some type, such as a flash drive or hard drive. The software programming code may be embodied in any of a variety of known media for use with a data processing system, such as a diskette, hard drive, or CD-ROM. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

While the invention has been particularly shown and described with reference to a preferred embodiment thereof, it will be understood by those skilled in the art that various other changes in the form and details may be made without departing from the spirit and scope of the invention.

A presently preferred embodiment of the present invention and many of its improvements have been described with a degree of particularity. It should be understood that this description has been made by way of example, and that the invention is defined by the scope of the following claims.

We claim:

1. A communication system comprising:
a first peer device; and
a second peer device configured to
operate a plurality of virtual internal stations,
generate a multiple media access control (MAC) address element, and
cause a given virtual internal station from said plurality thereof to communicate the multiple MAC address element to said first peer device;
said multiple MAC address element comprising
an element ID field comprising a physical MAC address for said second peer device,
a length field, and
a plurality of virtual MAC addresses, each virtual MAC address being associated with a respective virtual internal station from said plurality thereof;
the given virtual internal station from said plurality thereof configured to perform a beamforming training operation;
other virtual internal stations from the plurality thereof configured to use a same result from the beamforming training operation of the given virtual internal station.

2. The communication system of claim 1 wherein the given virtual internal station from said plurality thereof is configured to negotiate a Pairwise Master Key/Pairwise Transient Key (PMK/PTK); and wherein other virtual internal stations from the plurality thereof are configured to use the same PMK/PTK of the given virtual internal station.

3. The communication system of claim 1 wherein said plurality of virtual internal stations is configured to use a wakeup schedule.

4. The communication system of claim 1 wherein the given virtual internal station from said plurality thereof is configured to negotiate a Announcement Traffic Indication Message (ATIM) result in an awake window and an end of service period (EOSP) result; and wherein other virtual internal stations from the plurality thereof are configured to use the same ATIM and EOSP result of the given virtual internal station.

5. The communication system of claim 1 wherein at least one of said plurality of virtual internal stations and said first and second peer devices is configured to perform a beamforming training with an other device, the beamforming training comprising:
checking for multiple MAC addresses in the other device; and
when there are multiple MAC addresses, checking if a virtual internal station identified by the multiple MAC addresses has finished beamforming training with the at least one of said plurality of virtual internal stations and said first and second peer devices, and then using a beamforming result between the at least one of said plurality of virtual internal stations and said first and second peer devices and the virtual internal station to transmit frames between the at least one of said plurality of virtual internal stations and said first and second peer devices and the other device.

6. The communication system of claim 5 wherein the beamforming training further comprises:
when there are no multiple MAC addresses, performing beamforming training between the at least one of said plurality of virtual internal stations and said first and second peer devices and the other device; and
when a virtual internal station identified by multiple MAC addresses has not finished beamforming training with a virtual internal station identified by the multiple MAC addresses, performing beamforming training between the devices.

7. A communications device in a communication system comprising a peer device, the communications device comprising:
- a processor and a wireless transceiver configured to
  - operate a plurality of virtual internal stations,
  - generate a multiple media access control (MAC) address element, and
  - cause a given virtual internal station from said plurality thereof to communicate the multiple MAC address element to the peer device;
- the multiple MAC address element comprising
  - an element ID field comprising a physical MAC address for the communications device,
  - a length field, and
  - a plurality of virtual MAC addresses, each virtual MAC address being associated with a respective virtual internal station from the plurality thereof;
- the given virtual internal station from the plurality thereof configured to perform a beamforming training operation;
- other virtual internal stations from the plurality thereof configured to use a same result from the beamforming training operation of the given virtual internal station.

8. The communications device of claim 7 wherein the given virtual internal station from the plurality thereof is configured to negotiate a Pairwise Master Key/Pairwise Transient Key (PMK/PTK); and wherein other virtual internal stations from the plurality thereof are configured to use the same PMK/PTK of the given virtual internal station.

9. The communications device of claim 7 wherein the plurality of virtual internal stations is configured to use a wakeup schedule.

10. The communications device of claim 7 wherein the given virtual internal station from the plurality thereof is configured to negotiate a Announcement Traffic Indication Message (ATIM) result in an awake window and an end of service period (EOSP) result; and wherein other virtual internal stations from the plurality thereof are configured to use the same ATIM and EOSP result of the given virtual internal station.

11. The communications device of claim 7 wherein at least one of the plurality of virtual internal stations and the peer device is configured to perform a beamforming training with an other device, the beamforming training comprising:
- checking for multiple MAC addresses in the other device; and
- when there are multiple MAC addresses, checking if a virtual internal station identified by the multiple MAC addresses has finished beamforming training with the at least one of the plurality of virtual internal stations and the peer device, and then using a beamforming result between the at least one of the plurality of virtual internal stations and the peer device and the virtual internal station to transmit frames between the at least one of the plurality of virtual internal stations and the peer device and the other device.

12. The communications device of claim 11 wherein the beamforming training further comprises:
- when there are no multiple MAC addresses, performing beamforming training between the at least one of the plurality of virtual internal stations and the peer device and the other device; and
- when a virtual internal station identified by multiple MAC addresses has not finished beamforming training with a virtual internal station identified by the multiple MAC addresses, performing beamforming training between the devices.

13. A method for operating a communication system comprising a first peer device, and a second peer device, the method comprising:
- operating the second peer device to
  - operate a plurality of virtual internal stations,
  - generate a multiple media access control (MAC) address element, and
  - cause a given virtual internal station from said plurality thereof to communicate the multiple MAC address element to the first peer device;
- the multiple MAC address element comprising
  - an element ID field comprising a physical MAC address for the second peer device,
  - a length field, and
  - a plurality of virtual MAC addresses, each virtual MAC address being associated with a respective virtual internal station from the plurality thereof;
- the given virtual internal station from the plurality thereof configured to perform a beamforming training operation;
- other virtual internal stations from the plurality thereof configured to use a same result from the beamforming training operation of the virtual internal station.

14. The method of claim 13 wherein the given virtual internal station from the plurality thereof is configured to negotiate a Pairwise Master Key/Pairwise Transient Key (PMK/PTK); and wherein other virtual internal stations from the plurality thereof are configured to use the same PMK/PTK of the virtual internal station.

15. The method of claim 13 wherein the plurality of virtual internal stations is configured to use a wakeup schedule.

16. The method of claim 13 wherein the given virtual internal station from the plurality thereof is configured to negotiate a Announcement Traffic Indication Message (ATIM) result in an awake window and an end of service period (EOSP) result; and wherein other virtual internal stations from the plurality thereof are configured to use the same ATIM and EOSP result of the given virtual internal station.

17. The method of claim 13 wherein at least one of the plurality of virtual internal stations and the first and second peer devices is configured to perform a beamforming training with an other device, the beamforming training comprising:
- checking for multiple MAC addresses in the other device; and
- when there are multiple MAC addresses, checking if a virtual internal station identified by the multiple MAC addresses has finished beamforming training with the at least one of the plurality of virtual internal stations and the first and second peer devices, and then using a beamforming result between the at least one of the plurality of virtual internal stations and the first and second peer devices and the virtual internal station to transmit frames between the at least one of the plurality of virtual internal stations and the first and second peer devices and the other device.

18. The method of claim 17 wherein the beamforming training further comprises:
- when there are no multiple MAC addresses, performing beamforming training between the at least one of the plurality of virtual internal stations and the first and second peer devices and the other device; and
- when a virtual internal station identified by multiple MAC addresses has not finished beamforming training with a virtual internal station identified by the multiple MAC addresses, performing beamforming training between the devices.

\* \* \* \* \*